US008650485B2

(12) United States Patent
Tsai et al.

(10) Patent No.: US 8,650,485 B2
(45) Date of Patent: Feb. 11, 2014

(54) METHOD FOR INTEGRATING REALLY SIMPLE SYNDICATION DOCUMENTS (75) Inventors: Hung-Yang Tsai, Taipei (TW); Jung-Chun Hung, Taipei (TW)

(73) Assignee: Esobi Inc., George Town (KY)

( * ) Notice: Subject to any disclaimer, the term of this patent is extended or adjusted under 35 U.S.C. 154(b) by 217 days.

(21) Appl. No.: 13/233,508

(22) Filed: Sep. 15, 2011

(65) Prior Publication Data
US 2012/0072815 A1 Mar. 22, 2012

(30) Foreign Application Priority Data
Sep. 17, 2010 (TW) .............. 99131720 A (51) Int. Cl.
*G06F 17/00* (2006.01)
(52) U.S. Cl.
USPC ............ 715/255; 715/234; 715/243; 715/253
(58) Field of Classification Search
USPC ............... 715/201, 204, 234, 243, 253, 255
See application file for complete search history.

(56) References Cited

U.S. PATENT DOCUMENTS

| 8,200,775 | B2* | 6/2012 | Moore | 709/217 |
| 8,244,796 | B1* | 8/2012 | James et al. | 709/203 |
| 2006/0167860 | A1 | 7/2006 | Eliashberg et al. | |
| 2007/0100836 | A1* | 5/2007 | Eichstaedt et al. | 707/10 |
| 2007/0100959 | A1* | 5/2007 | Eichstaedt et al. | 709/217 |
| 2012/0254358 | A1* | 10/2012 | Wei et al. | 709/217 |

* cited by examiner

*Primary Examiner* — Stephen Hong
*Assistant Examiner* — Matthew Ludwig
(74) *Attorney, Agent, or Firm* — Muncy, Geissler, Olds & Lowe, PLLC (57) ABSTRACT A method for integrating Really Simple Syndication (RSS) documents includes extracting a data element set from an item of an RSS document and data elements contained in the data element set through a tag processing procedure; establishing a menu pool for displaying the content of the data element set and the content of the data elements; executing an editor to compose and edit the selected data element set and data elements, so as to combine the selected data element set and data elements into a new item; and outputting the new item as a target output document. Through the method, the content of various RSS documents is integrated into a customized Hypertext Markup Language (HTML) or RSS document meeting the requirements of a user.

13 Claims, 10 Drawing Sheets
(1 of 10 Drawing Sheet(s) Filed in Color)

FIG. 5 — RSS document

FIG. 6

```
<a class="title" href="http://tw.news.yahoo.com/article/url/d/a/100820/2/2bgba.html" target="_blank">
Too rich/Let eighty-million NTD house vacant to avoid troubles in renting-Yahoo! News
</a>
```
Data material A

```
<div class="url">
Source: tw.news.yahoo.com
</div>
```
Data material B

```
<div class="story_posted_item clearfix">
<img class="img_loading img" src="http://l.yimg.com/o/xp/udn/20100820/09/3158402912.jpg"
id="share_thumb_148063295212438" />
<div class="summary">
The gap between rich and poor in Taiwan gets increasingly larger, and can be described as "One Taiwan,
Two Worlds". Someone is long-term unemployed and can only make a living by doing odd jobs; while rich
people spend money recklessly, and once a plutocrat bought a house without hesitation because of good
feeling when passing through a new building.....
</div>
</div>
```
Data material assemble C

METHOD FOR INTEGRATING REALLY SIMPLE SYNDICATION DOCUMENTS

CROSS-REFERENCE TO RELATED APPLICATIONS

This non-provisional application claims priority under 35 U.S.C. §119(a) on Patent Application No(s). 099131720 filed in Taiwan, R.O.C. on Sep. 17, 2010, the entire contents of which are hereby incorporated by reference.

BACKGROUND OF THE INVENTION

1. Field of Invention

The disclosure relates to a method for integrating Extensible Markup Language (XML) documents, and more particularly, to a method for integrating Really Simple Syndication (RSS) documents.

2. Related Art

Rapid development of computers and the Internet, results in rapid explosion in the amount of information over the Internet. A search engine is a quite helpful tool for a used to find information of interests from websites on Internet. However this is not convenient for the user as Internet is still required.

A technology for providing summary information of web pages is already well-known, for example, the Really Simple Syndication Feed (RSS Feed) technology is a technology for distributing and collecting web page content through documents in the XML format. The RSS Feed technology may store summary information of websites as an RSS document of the XML format (referred to as an RSS document hereinafter), and the RSS document may include, for example, but is not limited to, the title and the summary content. The user may read subscribed RSS documents through an RSS aggregator by subscribing the RSS Feed from one or more websites, and even may regularly check and update functions through the RSS aggregator to obtain the latest information of the website.

US Publication No. 20060167860, entitled "Data extraction for feed generation", has disclosed a method for automatically generating a data feed. The method includes: obtaining multiple data elements by parsing a structured or non-structured resource containing the multiple data elements, in which the resource matches a predefined sample, and the sample is structured to be the data feed and has multiple fields; and combining the data elements obtained through parsing into one or more fields, so as to automatically generate a data feed.

In the prior art, the structures of the RSS feeds are structured RSS documents that have already been defined. The user may not modify or edit the RSS documents as desired to generate a customized RSS document or Hypertext Markup Language (HTML) document based on the requirement of the user.

SUMMARY OF THE INVENTION

The disclosure is a method for integrating RSS documents, which can perform customized content integration on RSS documents from multiple data feeds, so as to generate a customized HTML document or RSS document meeting the requirements of a user.

An embodiment of the disclosure comprises: acquiring multiple RSS documents; performing a tag processing procedure on each of the RSS documents, and extracting the content of a data element set and the content of data elements contained in the data element set from items contained in the RSS document; establishing a menu pool for displaying the extracted content of the data element set and the data elements; executing an editor to compose and edit the selected content of the data element set and the data elements; combining the composed and edited content of the data element set and the data elements into a new item; and outputting the new item as a target output document.

According to an embodiment of the disclosure, the method further comprises: combining the content of multiple data element sets and data elements after a plurality of composing and editing steps into a plurality of new items, and storing the plurality of new items in a temporary set; and after completing the composing and editing operation of the content of the data element sets and the content of the data elements, outputting the multiple new items in the temporary set as a target output document.

In the method for integrating RSS documents according to the embodiments of the disclosure, the RSS documents from different feeds may be re-composed and integrated into a customized HTML document or RSS document to meet the requirements of the user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will become more fully understood from the detailed description given herein below for illustration only, and thus are not limitative of the disclosure, and wherein.

DETAILED DESCRIPTION OF THE INVENTION

The method according to the disclosure may be implemented by a common electronic device having digital data processing capability, for example, a computer or a smart phone, and the computer herein comprises, but is not limited to, a personal computer or a note book computer, which executes the method disclosed in the following through software.

In FIG. 5 to FIG. 10, a part of program code of an RSS document is employed to exemplarily illustrate the implementation of the disclosure.

Figure 1:
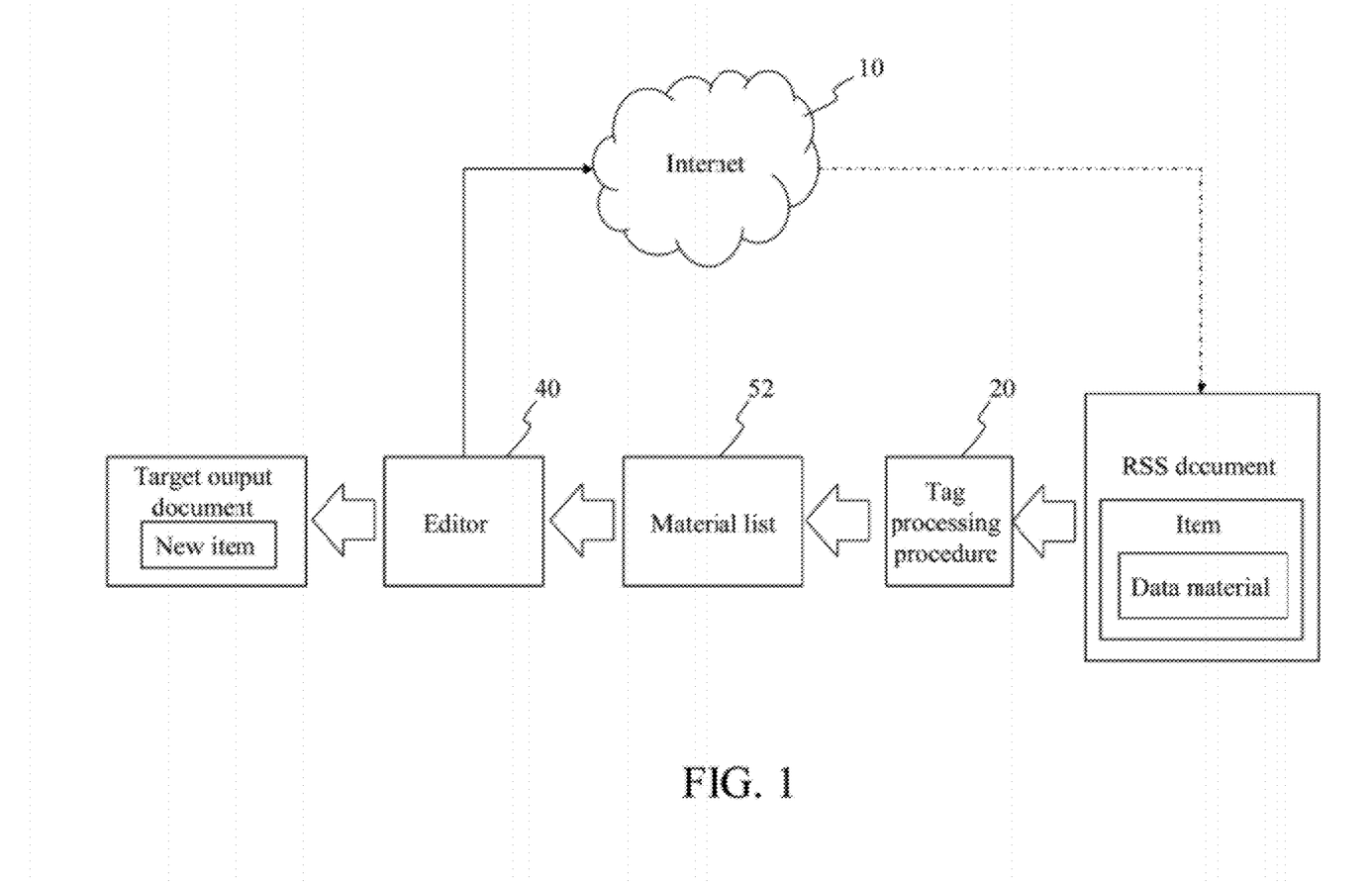
FIG. 1 is a schematic architecture view of the disclosure.

FIG. 1 is a schematic architecture view of the disclosure, which comprises:

1. acquiring various RSS documents from the Internet 10;

2. performing a tag processing procedure 20 on all items in each of the RSS documents, extracting the content of data element sets contained in the items and the content of data elements contained in the data element sets, and writing each extracted data into a first temporary set in sequence, in which the data content herein comprises the content of the data element sets and the content of the data elements;

3. establishing a menu pool 52 (see FIG. 4), and displaying each data in the first temporary set in the menu pool 52 in sequence for a user to select;

4. executing an editor 40, and loading the selected data in the menu pool 52 into an operation interface of the editor 40 for composing and editing;

5. storing the data after composing and editing as a new item, and writing the new item into a second temporary set;

6. repeating Step 1 to Step 5 to generate another new item after composing and editing, and writing the new items into the second temporary set in sequence, till the user confirms to end the composing and editing operation; and 7. combining the new items in the second temporary set as a target output document and output the target output document.

Generally, the RSS documents acquired in the steps of the method comprise many tags and the content labeled by the tags. The type of the tags comprises, for example, but is not limited to, any one of item <item>, author <author>, category <category>, website with comments <comments>, detailed description of the item <description>, attachment <enclosure>, globally unique identifier <guid>, website of the item <link>, publication date <pubDate>, <source>, inserted images <image>, and title of the item <title>. The content labeled by the tags comprises, for example, but is not limited to, any one of texts, hyperlinks, and multimedia documents.

Figure 2:
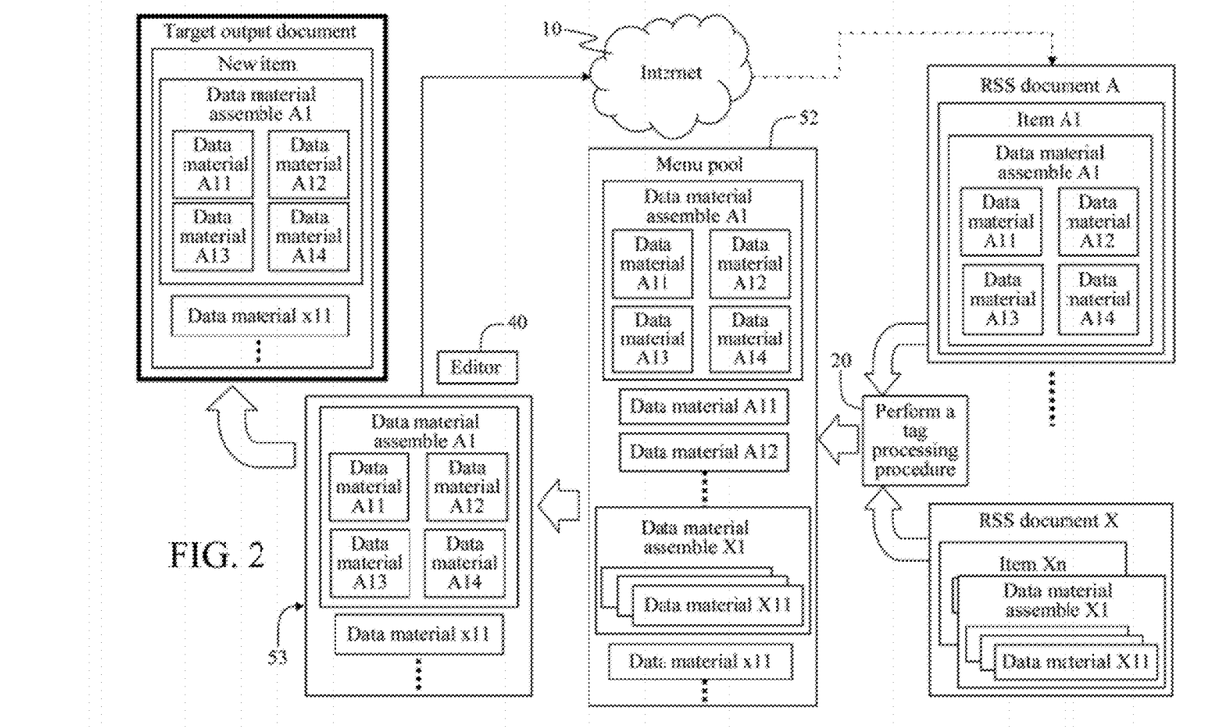
FIG. 2 is a schematic flow chart of a first embodiment, which shows details of steps in FIG. 1.

FIG. 2 is a schematic flow chart of a first embodiment, which shows details of the steps in FIG. 1. Multiple RSS documents (for example, RSS document A, . . . , and RSS document X) may be acquired from one or more RSS feeds in the Internet 10, each of the RSS documents may comprise one or more items (for example, item 1, . . . , and item n), and each of the items may further comprise one or more data element sets (for example, data element set A1, . . . , and data element set X1); the content of some data element set may further comprise various data elements (for example, the data element set A1 comprises data material A12, . . . , and data material A14), and the content of some data element set may only comprise one data material (for example, the data element set X1 only has one data material X11).

The tag processing procedure 20 in the steps of the method can extract each of the items in the RSS documents and the content of the data element sets and the content of the data elements labeled by different tags in each of the items through a tag recognition means. The tags comprise, for example, but are not limited to, <item>, <author>, <category>, <comments>, <description>, <enclosure>, <guid>, <link>, <pubDate>, <source>, <image>, and <title>.

An embodiment of the tag processing procedure 20 in the steps of the method extracts each of the tags in the RSS documents and the content labeled by the tag in a nest loop extraction mode, till all the tags and the content labeled by the tags are extracted In the following, an example of the RSS document is described to illustrate the nest loop extraction mode.

Figure 5:
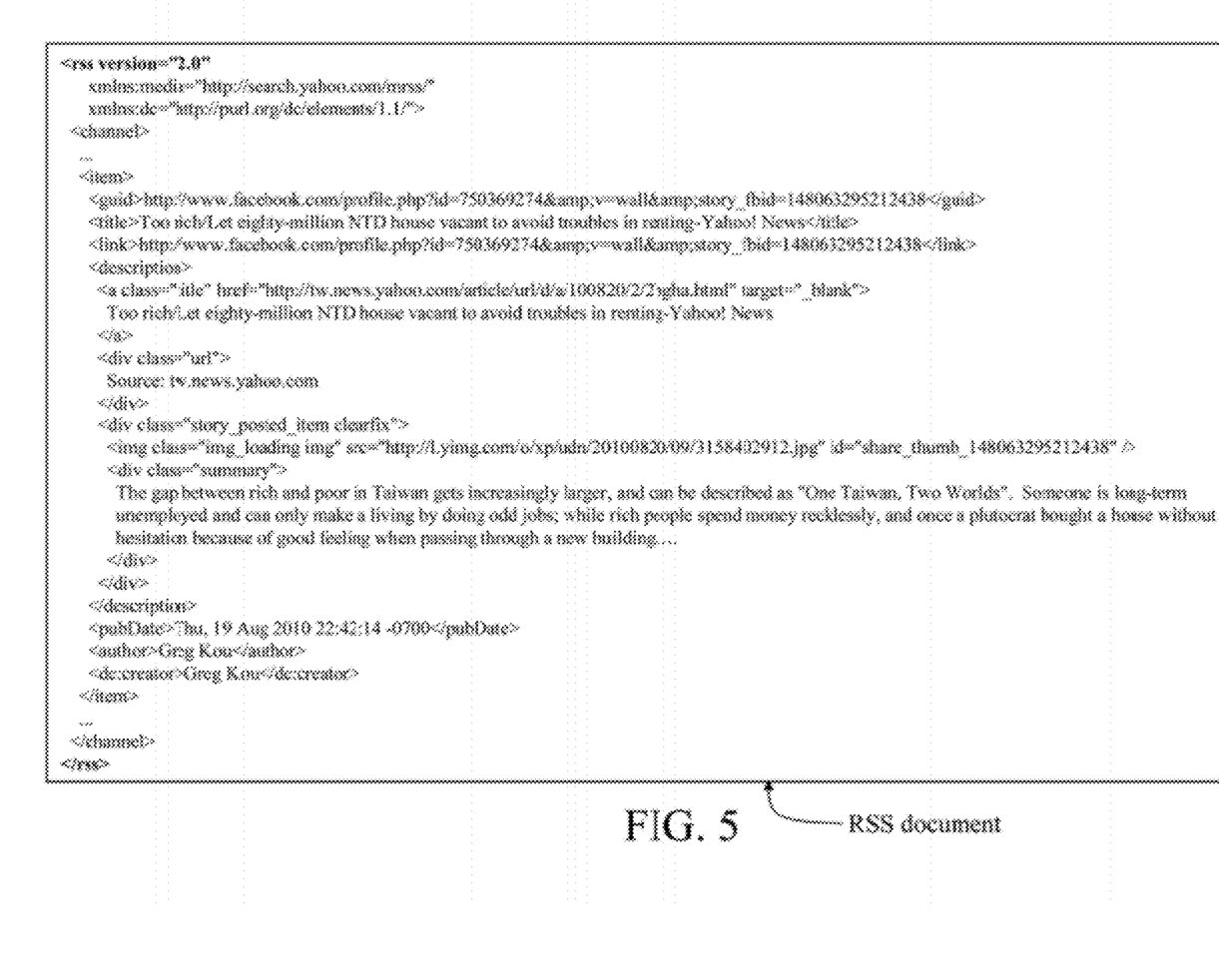
FIG. 5 to FIG. 10 are schematic views illustrating examples of a part of program code content of RSS documents.

The content of one RSS document is assumed as follows (as shown in FIG. 5):

1. <rss version="2.0">
2. xmlns:media="http://search.yahoo.com/mrss/"
3. xmlns:dc="http://purl.org/dc/elements/1.1/">
4. <channel>
5. . . .
6.     <item><guid>http://www.facebook.com/profile.php?id=750369274&v=wall&story_fbid=148063295212438</guid>
7. <title>Too rich/Let eighty-million NTD house vacant to avoid troubles in renting-Yahoo! News</title>
8.     <link>http://wvvw.facebook.com/profile.php?id=750369274&v=wall&story_fbid=148063295212438</link>
9. <description>
10. <a class="title" href="http://tw.news.yahoo.com/article/url/d/a/100820/2/2bgha.html" target="_blank">
11. Too rich/Let eighty-million NTD house vacant to avoid troubles in renting-Yahoo! News
12. </a>
13. <div class="url">
14. Source: tw.news.yahoo.com
15. </div>
16. <div class="story_posted_item clearfix">
17. <img class="img_loading img" src="http://1.yimg.com/o/xp/udn/20100820/09/3158402912.jpg" id="share_thumb__148063295212438"/>
18. <div class="summary">
19. The gap between rich and poor in Taiwan gets increasingly larger, and can be described as "One Taiwan, Two Worlds". Someone is long-term unemployed and can only make a living by doing odd jobs; while rich people spend money recklessly, and once a plutocrat bought a house without hesitation because of good feeling when passing through a new building . . . .
20. </div>
21. </div>
22. </description>
23. <pubDate>Thu, 19 Aug 2010 22:42:14-0700</pubDate>
24. <author>Greg Kou</author>
25. <dc:creator>Greg Kou</dc:creator>
26. </item>
27. . . .
28. </channel>
29. </rss>

According to the nest loop extraction mode, first, the levels of the items are processed, the content of the data element sets contained in the items is extracted in sequence, and then the content of the data elements contained in the content of the data element sets is extracted. If an RSS document comprises various items, the same processing is performed on each of the items in sequence. In the example in FIG. 2, according to the nest loop extraction mode, first, the item 1 is processed, the data element set A1 is extracted, and then the data material A12, . . . , and the data material A14 contained in the data element set A1 are all extracted. After the RSS document A is processed, the next RSS document is processed, till the last RSS document X is processed.

Figure 6:
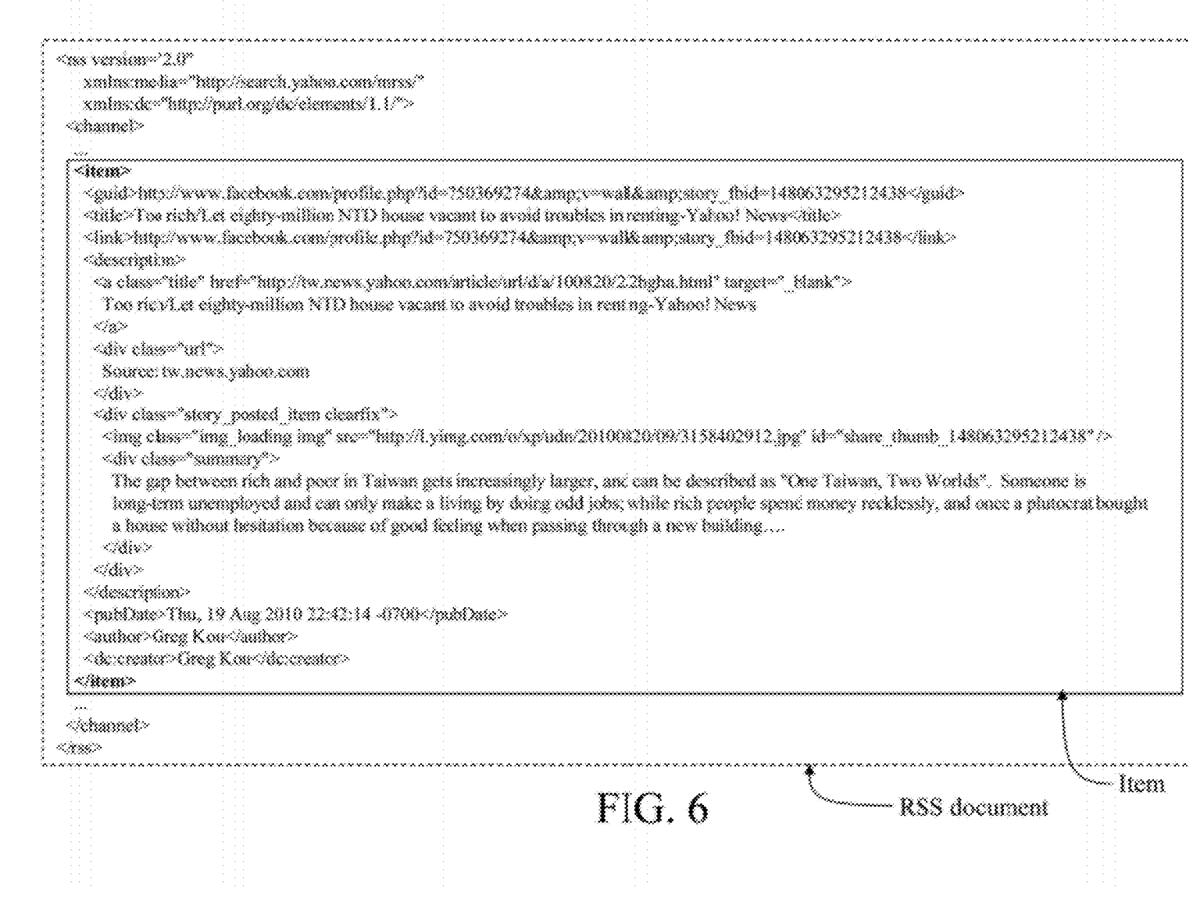
Figure 7:
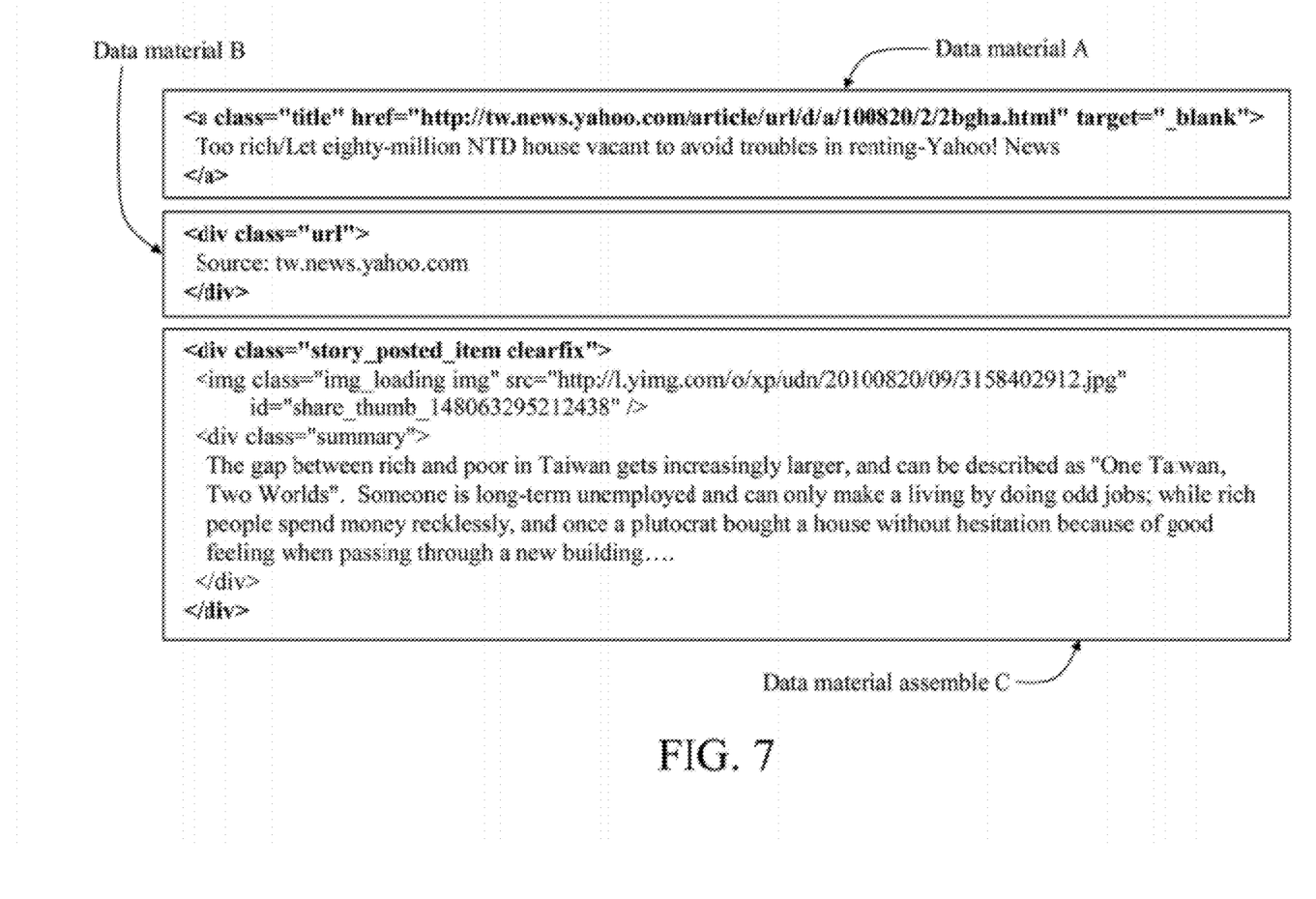

In the example of the RSS documents, according to the nest loop extraction mode, taking the RSS documents in FIG. 5 as an example, the RSS documents only have one item, which is the content labeled by the tag <item></item> and the tag <item></item> in Line 6 to Line 26 in the RSS documents, and the content is as shown in FIG. 6, and next, the content of the item is processed, in which the content of the data element A, the content of the data element B, and the content of the data element set C are extracted in sequence (as shown in FIG. 7).

Data element A
<a class="title" href="http://tw.news.yahoo.com/article/url/d/a/100820/2/2bgha.html" target="_blank">
Too rich/Let eighty-million NTD house vacant to avoid troubles in renting-Yahoo! News
</a>
Data material B
<div class="url">
Source: tw.news.yahoo.com
</div>

Data material assemble C
<div class="story_posted_item clearfix">
<img class="img_loading img" src="http://1.yimg.com/o/xp/udn/20100820/09/3158402912.jpg" id="share_thumb_148063295212438"/>
<div class="summary">

The gap between rich and poor in Taiwan gets increasingly larger, and can be described as "One Taiwan, Two Worlds". Someone is long-term unemployed and can only make a living by doing odd jobs; while rich people spend money recklessly, and once a plutocrat bought a house without hesitation because of good feeling when passing through a new building . . . .
</div>
</div>

As the data element set C further comprises various data elementdata elements, the nest loop extraction operation is further performed on the data element set C, and the content of the data element C_1 and the content of the data element C_2 are extracted in sequence (see FIG. 8), till the content of all the data element sets and the content of all the data elements in the items are extracted.

Figure 8:
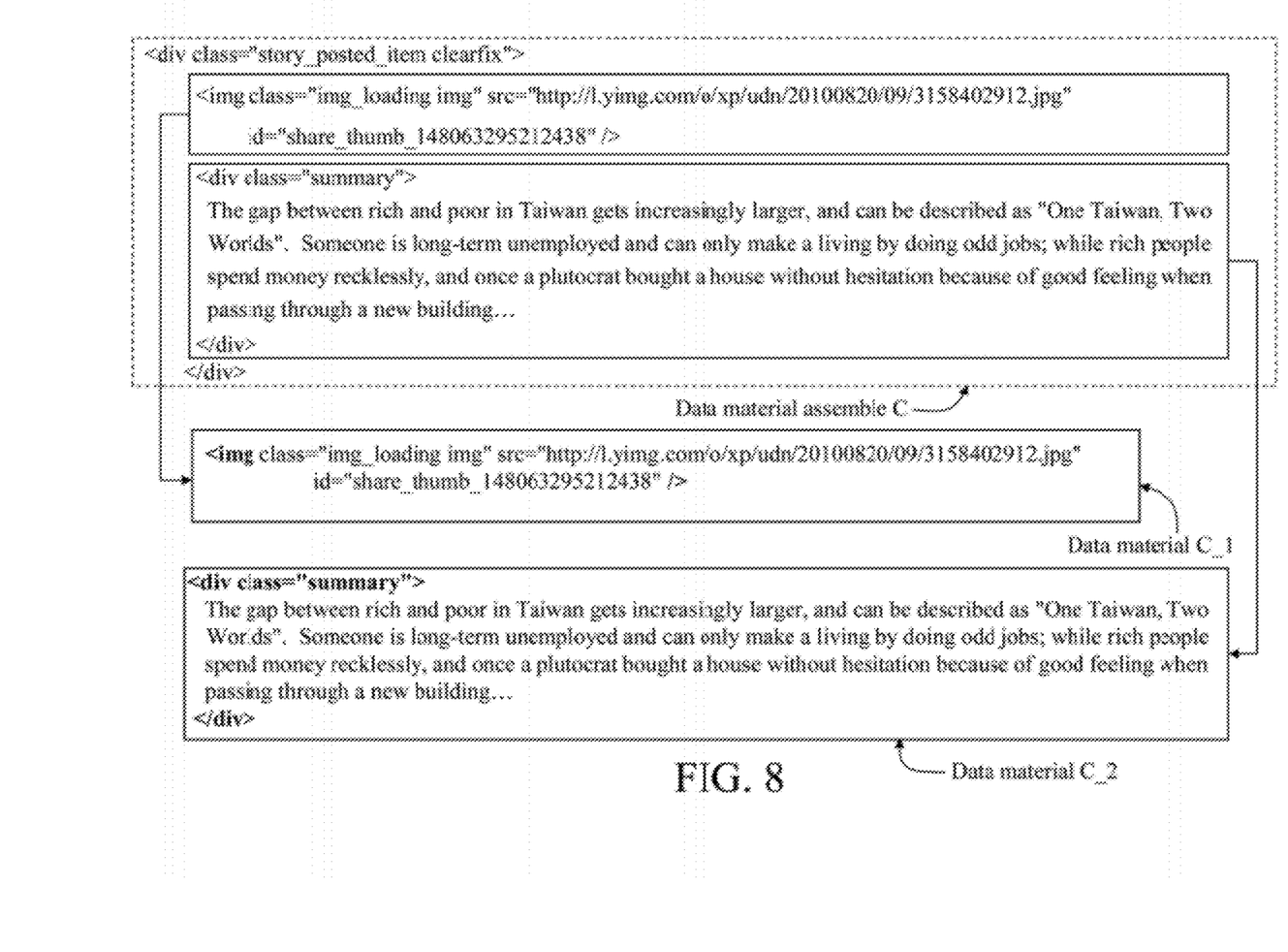

Data element C_1
<img class="img_loading img" src="http://1.yimg.com/o/xp/udn/20100820/09/3158402912.jpg" id="share_thumb_48063295212438"/>
Data material C_2
<div class="summary">

The gap between rich and poor in Taiwan gets increasingly larger, and can be described as "One Taiwan, Two Worlds". Someone is long-term unemployed and can only make a living by doing odd jobs; while rich people spend money recklessly, and once a plutocrat bought a house without hesitation because of good feeling when passing through a new building . . . .
</div>

Figure 9:
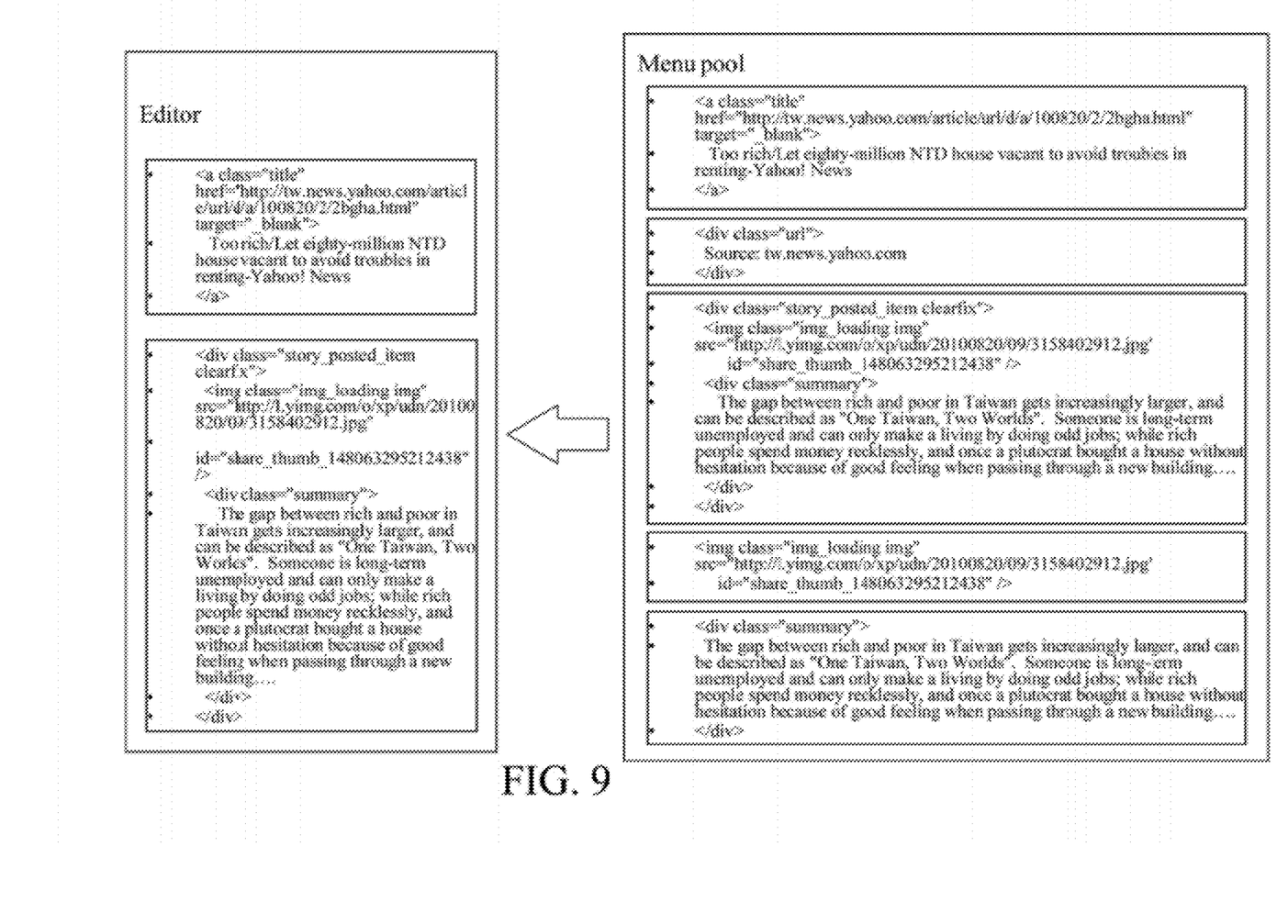

In an embodiment of the disclosure, the extracted content of the data element sets and the data elements may be converted into a document in the HTML format and displayed in a menu pool 52 as an element pool for the user to select. The menu pool 52 may display the extracted content of the data element sets and the data elementdata elements in a column listing manner (as shown in FIG. 9) or a scattered manner.

In an embodiment of the disclosure, the tags may not be displayed in the menu pool 52, and instead, the content of the data element sets and the content of the data elements are displayed in the menu pool 52 by using the same web page content displaying manner as the browser, for example, the content of a data element is displayed as follows:
<div class="url">
Source: tw.news.yahoo.com
</div>

If the same web page content displaying manner as the browser is adopted in the menu pool 52, only the text "tw.news.yahoo.com" is displayed in the menu pool 52 as a hyperlink tw.news.yahoo.com. Similarly, if the content of a data element is an image, the image may be displayed in the menu pool 52 in the form of a thumbnail, so as to provide the user with the same displaying effect as the browser, which is convenient for the user to select.

Figure 4:
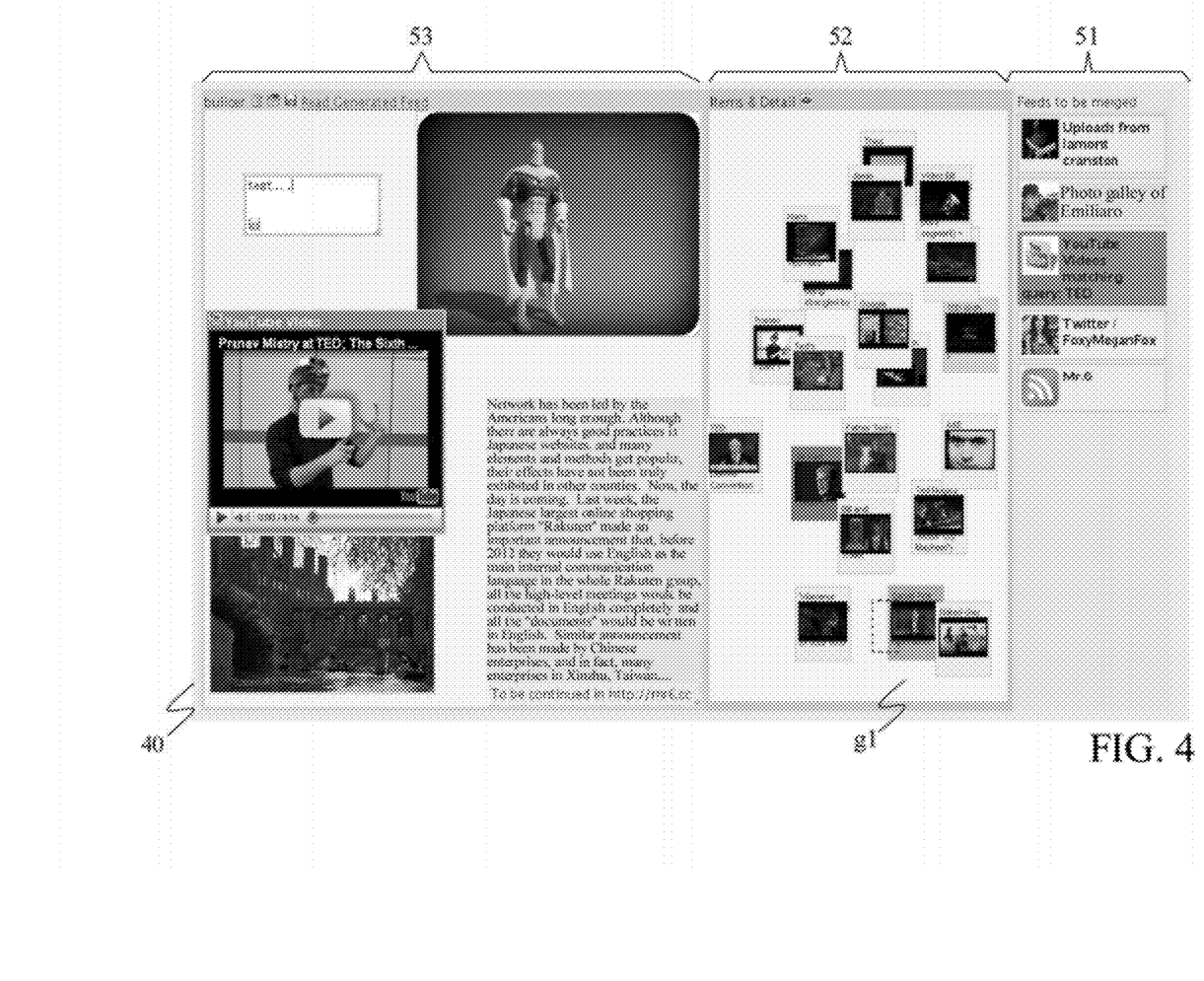
FIG. 4 is a schematic view of a program interface, which shows an embodiment of the program interface for implementing the method of the disclosure.

In another embodiment of the disclosure, the extracted content of the data element sets and the data elements may be displayed in the menu pool 52 in different groups (g1s) (as shown in FIG. 4), so that the relevant content of the data element sets and the data elements is collected together systematically, which is convenient for the user to find and identify.

As shown in FIG. 2, the content of the data element sets and the content of the data elements selected by the user in the menu pool 52 are loaded into a material editing region 53 of the editor 40, and the specific implementation is that, the user loads the selected content of the data element sets and the data elements to a position designated by the user in the material editing region 53 in the manner of clicking or dragging. Through such a manner, the user can compose the position of the content of the data element sets and the content of the data elements in the material editing region 53 as required. In an embodiment of the disclosure, the user may further perform editing operation (comprising modifying and deleting the data element) on the content of the data element sets and the content of the data element data elements in the material editing region 53.

Figure 10:
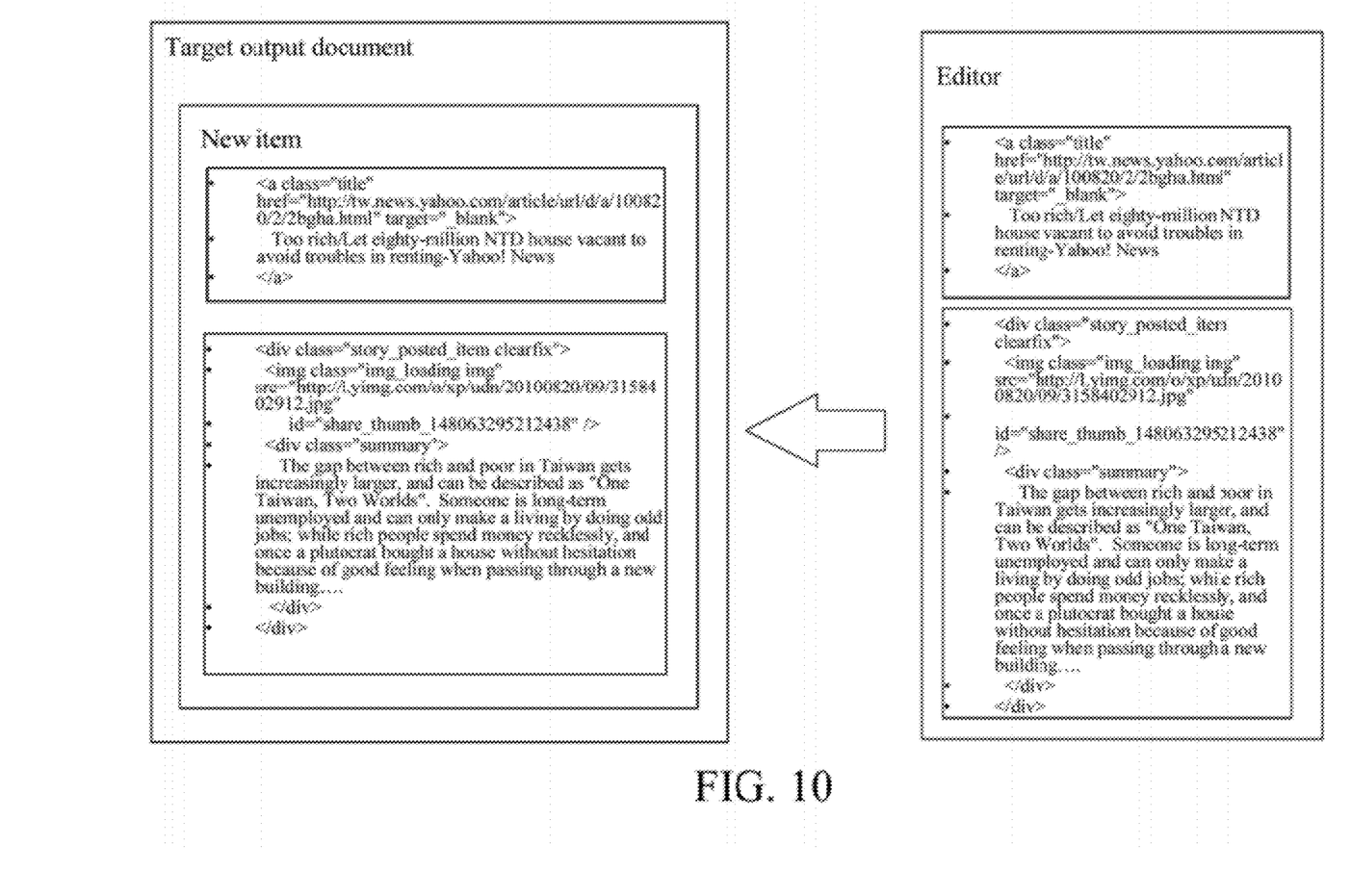

As shown in FIG. 2, the content of the data element sets and the content of the data elements after composing and editing are stored as a new item, and then output as a target output document (see FIG. 10). According to an embodiment of the disclosure, the target output document may be an HTML document or an RSS document.

Figure 3:
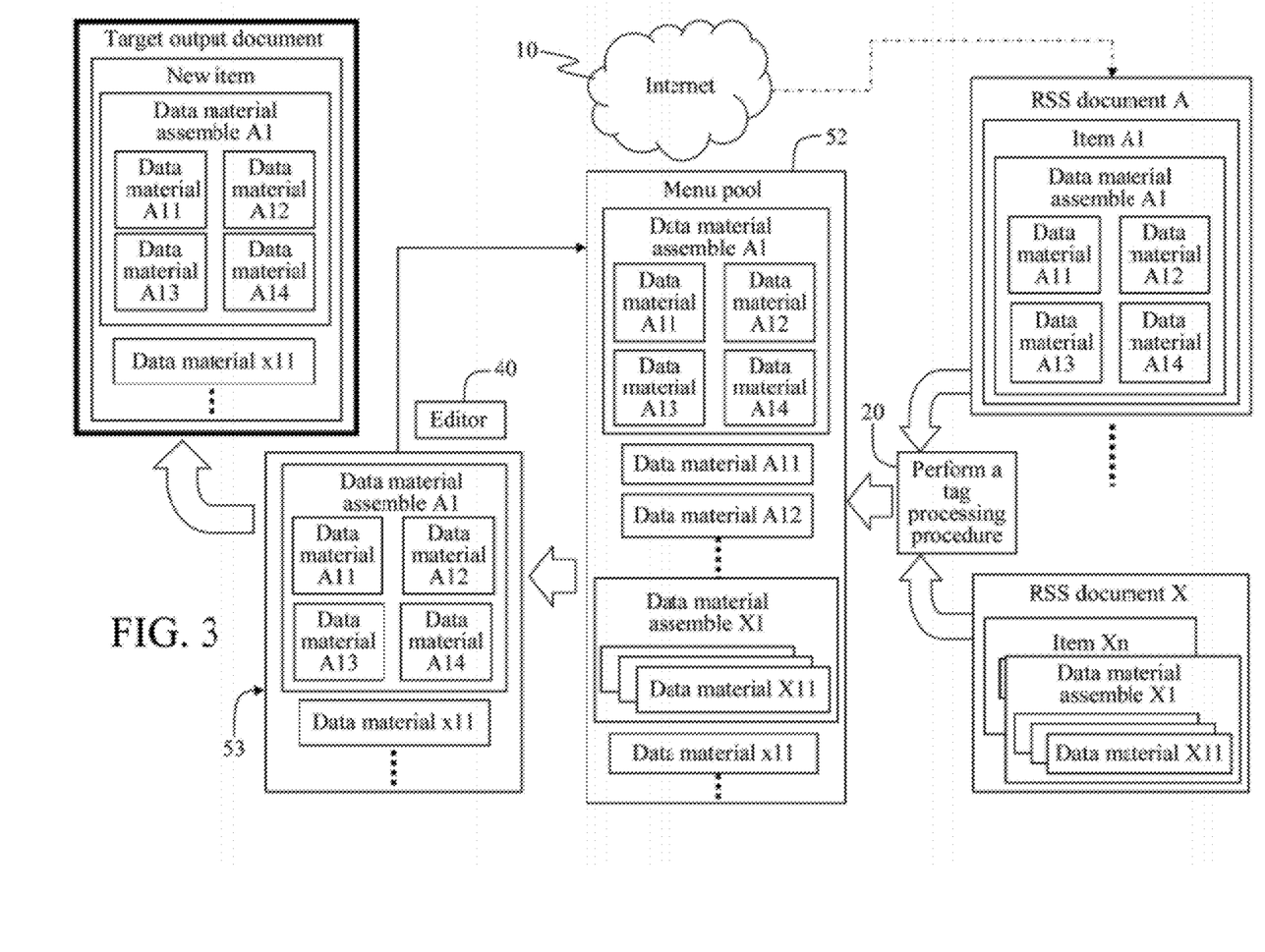
FIG. 3 is a schematic flow chart of a second embodiment, which shows steps according to another embodiment of the method of the disclosure.

Another embodiment of the disclosure further comprises combining the content of various data element sets and data elements after various composing and editing steps into various new items, as shown in FIG. 3, in which the new item generated after the content of the data element sets and the content of the data elements are composed and edited each time by using the editor 40 is stored in a temporary set; and the content of the data element sets and the content of the data elements are repeatedly selected from the menu pool 52 for the composing and editing operation, till the user confirms to end the composing and editing operation of the data element sets and the data elements, and then the various new items in the temporary set are output as a target output document. The method according to this embodiment comprises:

A. acquiring various RSS documents from the Internet 10;

B. performing a tag processing procedure 20 on all items in each of the RSS documents, extracting the content of data element sets contained in the items and the content of data elements contained in the data element sets, and writing each extracted data into a first temporary set in sequence, in which the data content herein comprises the content of the data element sets and the content of the data elements;

C. establishing a menu pool 52 (see FIG. 4), and displaying each data in the first temporary set in the menu pool 52 in sequence for a user to select;

D. executing an editor 40, and loading the selected data in the menu pool 52 into an operation interface of the editor 40 for composing and editing;

E. storing the data after composing and editing as a new item, and writing the new item into a second temporary set;

F. repeating Step C to Step F to generate another new item after composing and editing, and writing the new items into the second temporary set in sequence, till the user confirms to end the composing and editing operation; and G combining the new items in the second temporary set as a target output document, and outputting the target output document.

FIG. 4 is a schematic view of a program interface, which shows an embodiment of the program interface for implementing the method of the disclosure. Here, the program interface comprises: a feed display region 51, for displaying the various RSS documents acquired from the Internet 10; a menu pool 52, for displaying the content of the data element sets and the content of the data elements extracted by the tag processing procedure 20 as a element pool for the user to select; and a material editing region 53, serving as a composing and editing operation window of the editor 40, so as to facilitate the composing and editing operation on the selected content of the data element sets and data elements by the user.

What is claimed is:

1. A method for integrating Really Simple Syndication (RSS) documents, applied for integrating content of various RSS documents into a target output document, the method comprising:
   S1. acquiring the RSS documents;
   S2. performing a tag processing procedure on all items in each of the RSS documents, extracting the content of data element sets contained in the items and the content of data elements contained in the element sets, and writing the content of data element sets contained in the items and the content of data elements contained in the data element sets which are extracted into a first temporary set in sequence;
   S3. establishing a menu pool, and displaying the content of data elements contained in the items and content of data elements in the first temporary set in the menu pool in sequence for a user to select, wherein the extracted content of the data element sets and the data elements are displayed in the menu pool in different structural groups;
   S4. executing an editor, and loading the selected content from the menu pool into an operation interface of the editor for composing and editing;
   S5. storing the selected content after composing and editing as a new item, and writing the new item into a second temporary set;
   S6. repeating steps S1 to S5 to generate another new item after composing and editing, until the user confirms to end the composing and editing operation, wherein the new items generated are written into the second temporary set;
   S7. combining the new items in the second temporary set as a target output document and outputting the target output document.

2. The method for integrating RSS documents according to claim 1, wherein the tag processing procedure extracts each tag in the RSS documents and the content labeled by the tag in a nest loop extraction mode, until all the tags and the content labeled by the tags are extracted.

3. The method for integrating RSS documents according to claim 1, wherein the content of the data elements extracted by the tag processing procedure is a tag and the content labeled by the tag.

4. The method for integrating RSS documents according to claim 3, wherein the content labeled by the tag comprises any one of texts, hyperlinks, and multimedia documents.

5. The method for integrating RSS documents according to claim 3, wherein a type of the tag comprises any one of <item>, <author>, <category>, <comments>, <description>, <enclosure>, <guid>, <link>, <pubDate>, <source>, and <title>.

6. The method for integrating RSS documents according to claim 1, wherein the menu pool displays the extracted content of the data element sets and data elements in a column listing manner or a scattered manner.

7. The method for integrating RSS documents according to claim 1, wherein the target output document is a Hypertext Markup Language (HTML) document or an RSS document.

8. A method for integrating Really Simple Syndication (RSS) documents, applied for integrating content of various RSS documents into a target output document, the method comprising:
   S1. acquiring the RSS documents;
   S2. performing a tag processing procedure on all items in each of the RSS documents, extracting the content of data element sets contained in the items and the content of data elements contained in the element sets, and writing the content of data element sets contained in the items and the content of data elements contained in the data element sets which are extracted into a first temporary set in sequence;
   S3. establishing a menu pool, and displaying the content of data elements contained in the items and content of data elements in the first temporary set in the menu pool in sequence for a user to select, wherein the extracted content of the data element sets and the data elements are displayed in the menu pool in different structural groups;
   S4. executing an editor, and loading the selected content from the menu pool into an operation interface of the editor for composing and editing;
   S5. storing the selected content after composing and editing as a new item, and writing the new item into a second temporary set;
   S6. repeating steps S3 to S5 to generate another new item after composing and editing, until the user confirms to end the composing and editing operation, wherein the new items generated are written into the second temporary set;
   S7. combining the new items in the second temporary set as a target output document and outputting the target output document.

9. The method for integrating RSS documents according to claim 8, wherein the tag processing procedure extracts each tag in the RSS documents and the content labeled by the tag in a nest loop extraction mode, until all the tags and the content labeled by the tags are extracted.

10. The method for integrating RSS documents according to claim 8, wherein the data elements extracted by the tag processing procedure are a tag and the content labeled by the tag.

11. The method for integrating RSS documents according to claim 10, wherein the content labeled by the tag comprises any one of texts, hyperlinks, and multimedia documents.

12. The method for integrating RSS documents according to claim 8, wherein the menu pool displays the extracted content of the data element sets and data elements in a column listing manner or a scattered manner.

13. The method for integrating RSS documents according to claim 8, wherein the target output document is a Hypertext Markup Language (HTML) document or an RSS document.

* * * * *